United States Patent
Mullins et al.

(10) Patent No.: US 6,768,776 B1
(45) Date of Patent: Jul. 27, 2004

(54) TRANSCODER-CODEC CIRCUIT ARRANGEMENT AND METHOD THAT SUPPORTS VOICE-SWITCHED HANDS-FREE RADIO OPERATION

(75) Inventors: Jacqueline E. Mullins, Austin, TX (US); Daren Ledell Allee, Austin, TX (US); John G. Bartkowiak, Austin, TX (US)

(73) Assignee: Legerity, Inc., Austin, TX (US)

( * ) Notice: Subject to any disclaimer, the term of this patent is extended or adjusted under 35 U.S.C. 154(b) by 1101 days.

(21) Appl. No.: 09/047,866

(22) Filed: Mar. 25, 1998

Related U.S. Application Data

(63) Continuation-in-part of application No. 08/909,383, filed on Aug. 11, 1997, now Pat. No. 5,946,353, which is a continuation of application No. 08/668,600, filed on Jun. 18, 1996, now Pat. No. 5,657,351, which is a continuation of application No. 08/192,057, filed on Feb. 4, 1994, now abandoned.

(51) Int. Cl.[7] .............................................. H04B 14/06
(52) U.S. Cl. ..................................................... 375/244
(58) Field of Search .......................... 375/244; 327/58; 379/390

(56) References Cited

U.S. PATENT DOCUMENTS 4,686,390 A * 8/1987 Cleary, Jr. et al. ............ 327/58
5,471,528 A * 11/1995 Reesor ........................ 379/390

FOREIGN PATENT DOCUMENTS

WO    WO9306679    * 4/1993    .................. 379/390

* cited by examiner

Primary Examiner—Khai Tran
Assistant Examiner—Kevin M Burd

(57) ABSTRACT

A transcoder-codec circuit arrangement that supports voice-switched hands-free radio operation. A first register is arranged to store a value indicative of a peak signal in a receive signal path, a first attenuator is coupled to the receive path, a second register is arranged to store a value indicative of a peak signal in a transmit signal path, a second attenuator is coupled to the transmit signal path, and a digital signal processor is coupled to the first and second registers and configured and arranged to update the value in the first register with a present peak receive signal level if the value in the first register is less than the present peak receive signal level. The digital signal processor is further arranged to update the value in the second register to a present peak transmit signal level if the value in the second register is less than the present peak transmit signal level. A microcontroller is coupled to the first and second registers and to the first and second attenuators and is configured to read values from the first and second register and adjust the first and second attenuators in response to the values.

23 Claims, 7 Drawing Sheets

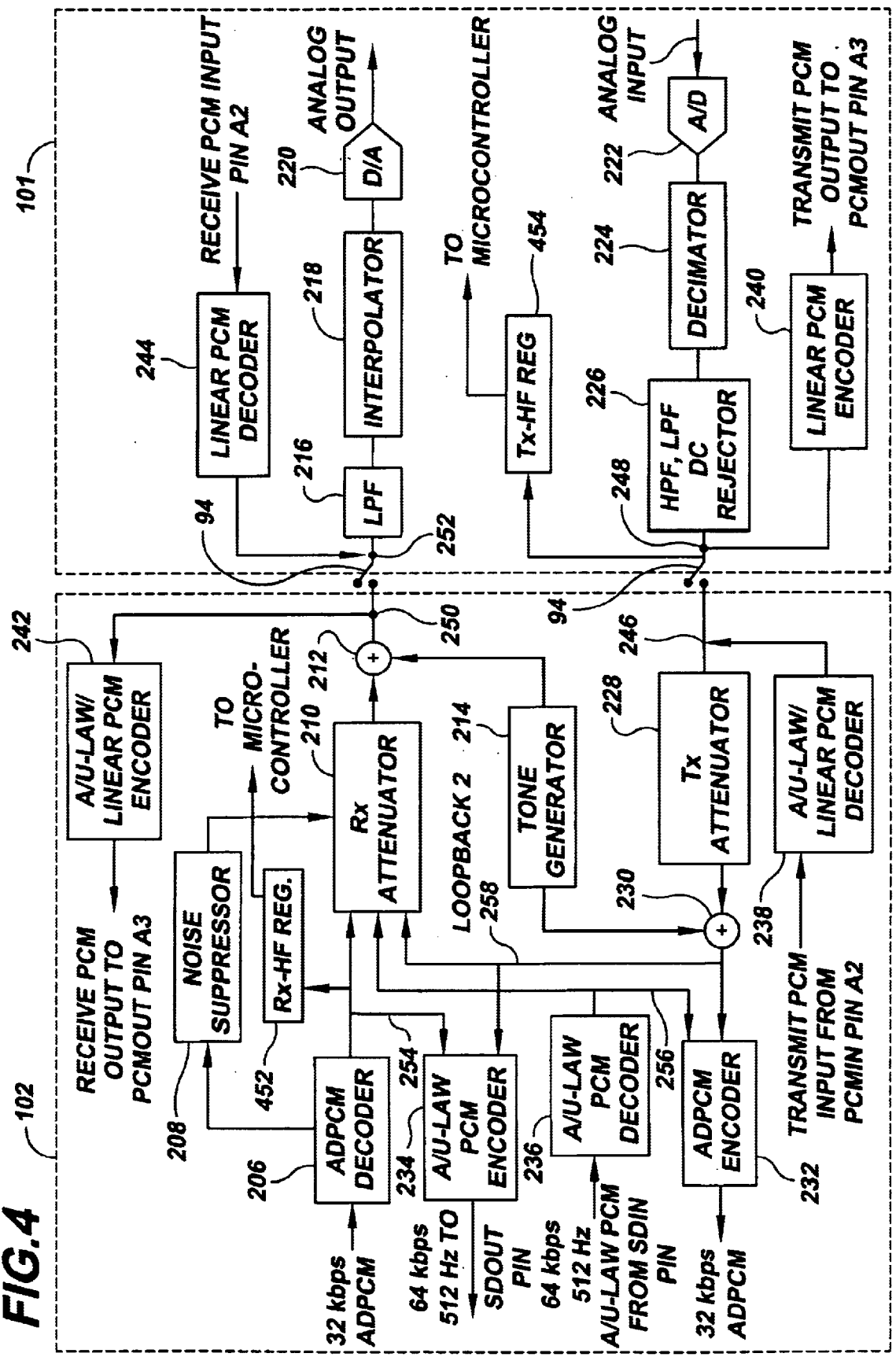

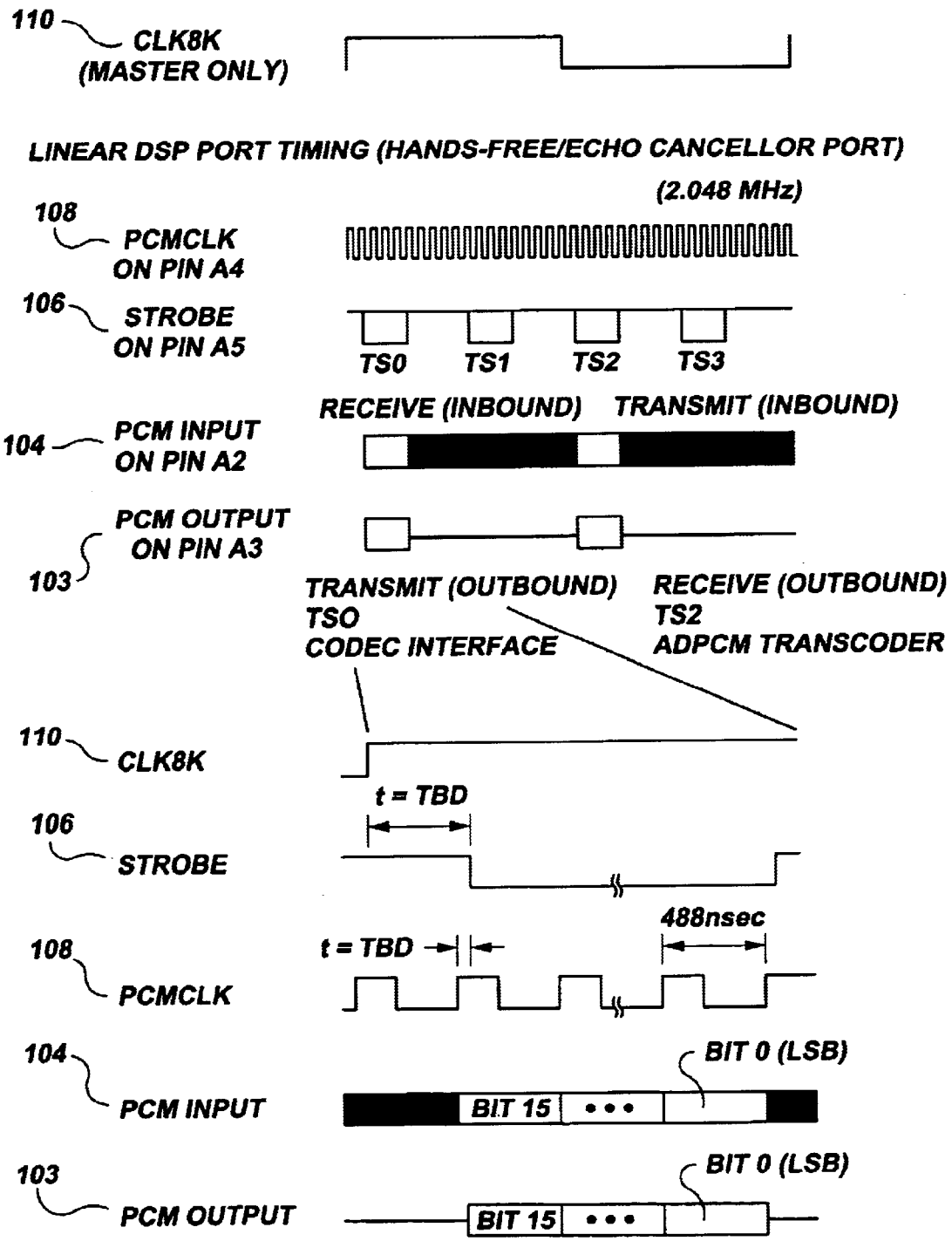

US 6,768,776 B1

TRANSCODER-CODEC CIRCUIT ARRANGEMENT AND METHOD THAT SUPPORTS VOICE-SWITCHED HANDS-FREE RADIO OPERATION

CROSS-REFERENCE TO RELATED APPLICATIONS

This application is a continuation-in-part of U.S. patent apilication Ser. No. 08/909,383 filed on Aug. 11 ,1997 now U.S. Pat. No. 5,946,353 by Mullins et al., entitled "METHOD AND APPARATUS FOR EXTERNAL INTERMEDIATE DATA PROCESSING," which is a continuation of U.S. patent application Ser. No. 08/668,600 by Mullins et al., filed on Jun. 18, 1996, now U.S. Pat. No. 5,657,351, which is a continuation of U.S. patent application Ser. No. 08/192,057 by Mullins et al., filed on Feb. 4, 1994, now abandoned.

FIELD OF THE PRESENT INVENTION

The present invention relates to telecommunication controllers (i.e., IC) and, more particularly, voice-switched hands-free radio operation and external intermediate data processing for such controllers.

BACKGROUND

The cordless telephone industry is currently in a state of expansion and transition. Several cordless telephone system standards have been previously developed. Currently these existing standards collectively require different types of data processing.

Additionally, new system standards for data processing are required by various countries to contend with the expansion of the cordless telephone industry. One standard, Cordless Telephony Generation 2 (CT2) interface specification for digital technology, is currently widely followed in the United Kingdom and certain European countries. The CT2 standard has been accepted by the European Telecommunications Standard Institute (ETSI) as an interim European standard. Unfortunately, not all countries have adopted the same standard. For example, the U.S. follows a standard that is different than the CT2 standard.

Current cordless telephone controllers utilized by the telecommunication industry, such as, for example, Am79C410 controller (i.e., IC) manufactured by Advanced Micro Devices (AMD), perform data processing internally. Since the data processing is internal, the controller must be redesigned each time requirements or standards change so that the data processing complies with the new specifications and standards. Redesign and fabrication of new controllers is expensive and time consuming. Furthermore, fabrication lot sizes must be carefully calculated to avoid creating an excess inventory of outdated controllers.

It would be a distinct advantage to have a controller which is not heavily dependent upon an internal data processing capability. If the controller's data processing could be upgraded without redesigning and fabricating a new controller, larger quantities of controllers could be manufactured, thereby achieving lower unit costs. Furthermore, the data processing capability of the controller could be upgraded more frequently to meet ever-changing specifications and standards. Providing a controller with a design that is not heavily dependent upon an internal data processing capability eliminates the need to design a new controller for each new data processing implementation. The present invention provides a controller with these advantages.

SUMMARY OF THE INVENTION

According to one example embodiment, the invention is directed to a transcoder-codec circuit arrangement that supports voice-switched hands-free radio operation. The circuit arrangement comprises: a first register arranged to store a value indicative of a peak signal in a receive signal path; a first attenuator coupled to the receive path; a second register arranged to store a value indicative of a peak signal in a transmit signal path; a second attenuator coupled to the transmit signal path; a digital signal processor coupled to the first and second registers and configured and arranged to update the value in the first register with a present peak receive signal level if the value in the first register is less than the present peak receive signal level, and arranged to update the value in the second register to a present peak transmit signal level if the value in the second register is less than the present peak transmit signal level; and a microcontroller coupled to the first and second registers and to the first and second attenuators and configured to read values from the first and second register and adjust the first and second attenuators in response to the values.

In another example embodiment, the invention includes a method for supporting voice-switched hands-free radio operation in a transcoder-codec circuit arrangement. The method comprises the steps of: storing in a first register a value indicative of a peak signal in a receive signal path; storing in a second register a value indicative of a peak signal in a transmit signal path; periodically updating the value in the first register with a present peak receive signal level if the value in the first register is less than the present peak receive signal level; periodically updating the value in the second register with a present peak transmit signal level if the value in the second register is less than the present peak transmit signal level; reading values from the first and second registers with the microcontroller and adjusting attenuation levels of signals in the receive signal path and in the transmit signal path in response to values read from the first and second registers.

According to another example embodiment of the present invention, an apparatus is adapted for supporting voice-switched hands-free radio operation in a transcoder-codec circuit arrangement with an intermediate, external digital signal processor according to another embodiment. The apparatus comprises: means for storing a first value indicative of a peak signal in a receive signal path; means for storing a second value indicative of a peak signal in a transmit signal path; means for periodically updating the first value with a present peak receive signal level if the first value is less than the present peak receive signal level; means for periodically updating the second value with a present peak transmit signal level if the second value is less than the present peak transmit signal level; means for reading the first and second values; and means for adjusting attenuation levels of signals in the receive signal path and in the transmit signal path in response to the read first and second values.

The above summary of the present invention is not intended to describe each illustrated embodiment or every implementation of the present invention. The figures in the detailed description which follow more particularly exemplify these embodiments.

BRIEF DESCRIPTION OF THE DRAWINGS

The present invention will be better understood and its numerous objects and advantages will become more apparent to those skilled in the art by reference to the following drawings, in conjunction with the accompanying specification, in which:

FIG. 4 is a schematic diagram illustrating the transcoder and codec of FIG. 3 in more detail in the preferred embodiment of the present invention; and FIG. 5 is a timing diagram illustrating timing sequences utilized for intermediate data processing that may be employed in the transcoder and codec of FIG. 4 in the preferred embodiment of the present invention.

Figure 1A:
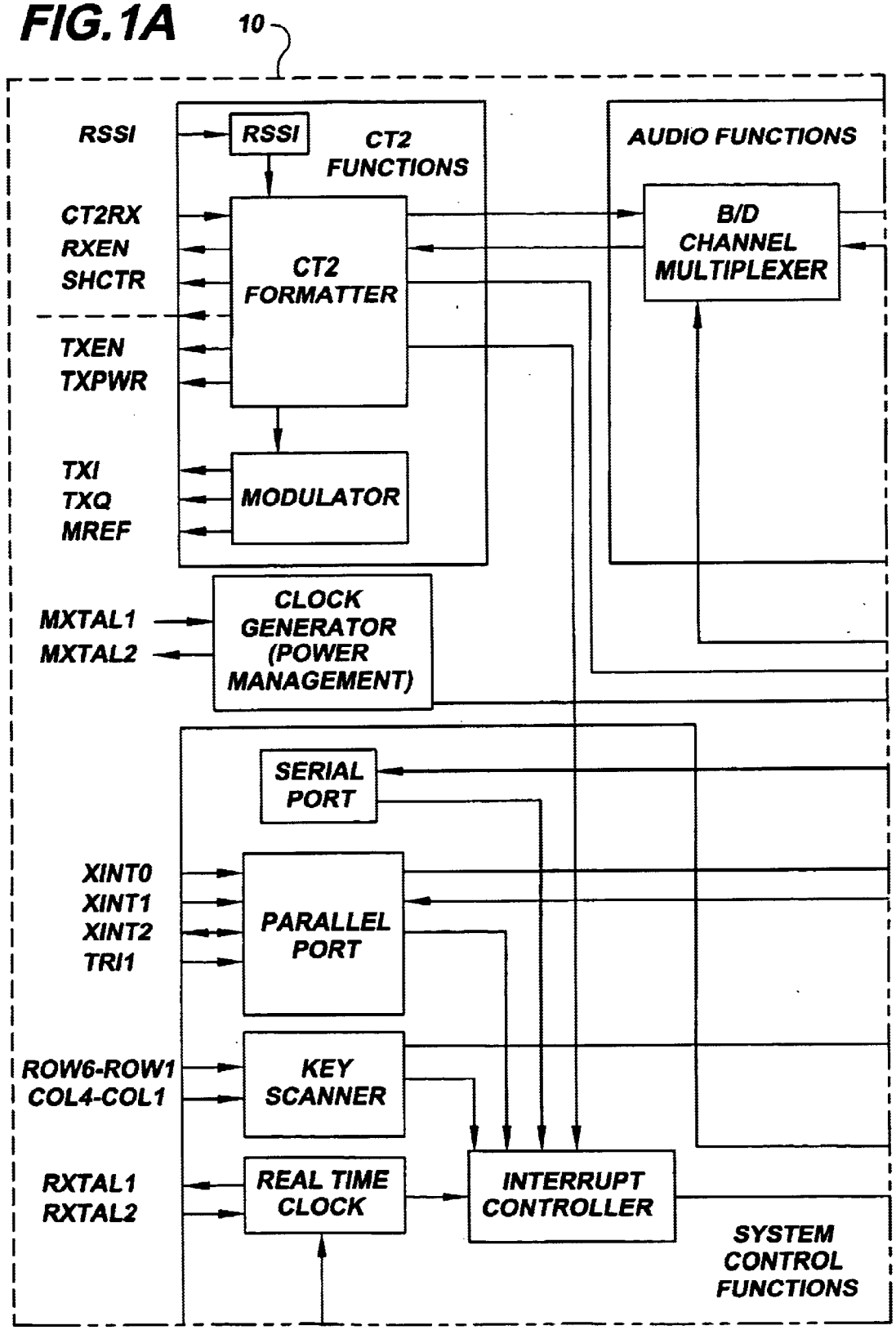
FIG. 1A is a block diagram of a portion of a controller for a digital cordless handset and base station, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The preferred embodiment of the present invention may be implemented in a controller 10 as illustrated in FIGS. 1A, 1B, 1C and 1D that, taken together, are included in controller 10. The controller 10 may be, for example, the Am79C410A CT2 manufactured by Advanced Micro Devices (AMD). An earlier version of the controller 10 (Am79C410) is described in more detail in co-pending U.S. patent application Ser. No. 07/918,627 and titled "INTEGRATED CIRCUIT AND CORDLESS TELEPHONE USING THE INTEGRATED CIRCUIT" and filed Jul. 21, 1992 by Gulick, et al., which is incorporated herein by reference.

Figure 1B:
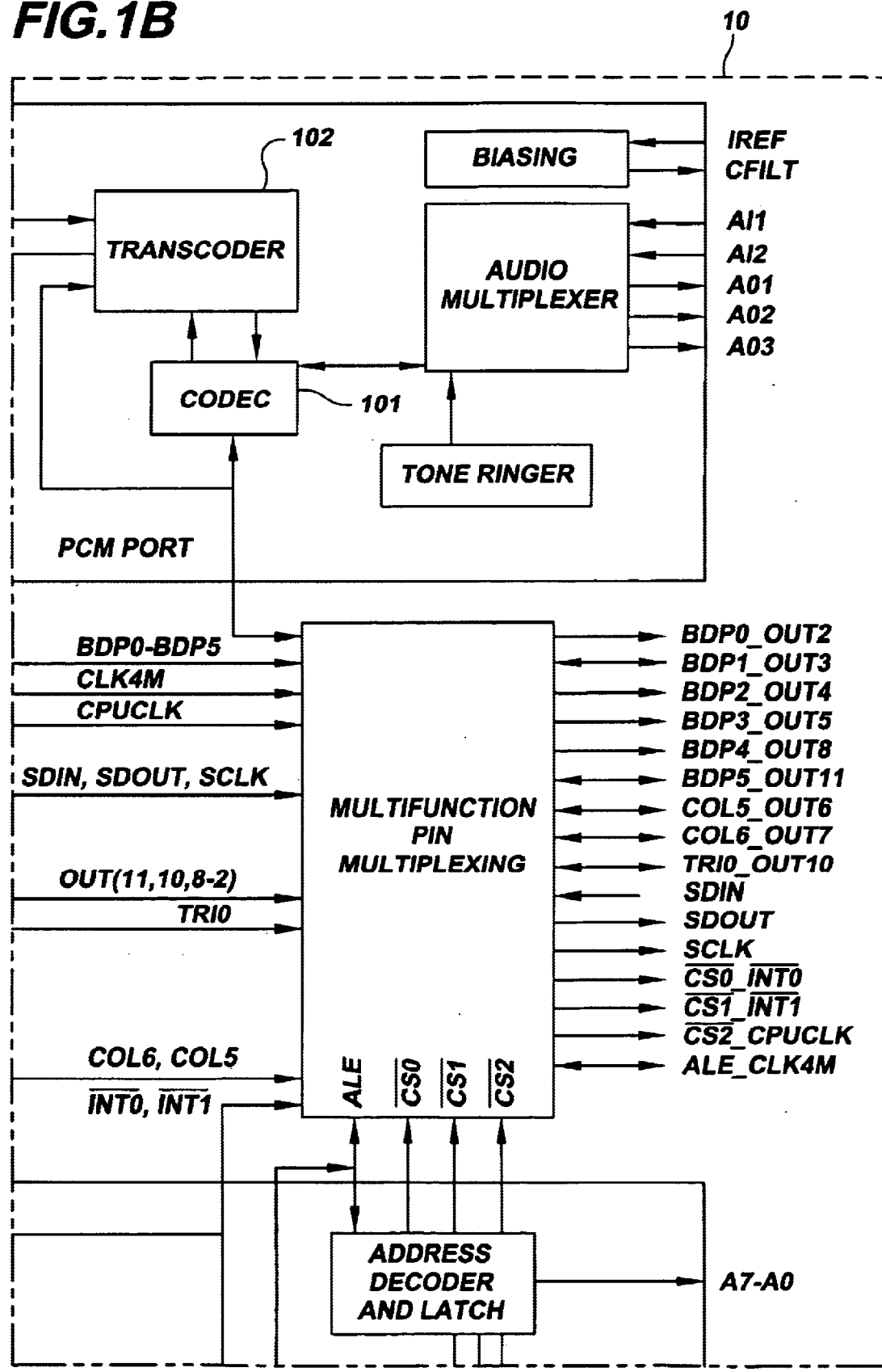
FIG. 1B is a block diagram of a portion of a controller for a digital cordless handset and base station, according to an example embodiment of the present invention.
Figure 1C:
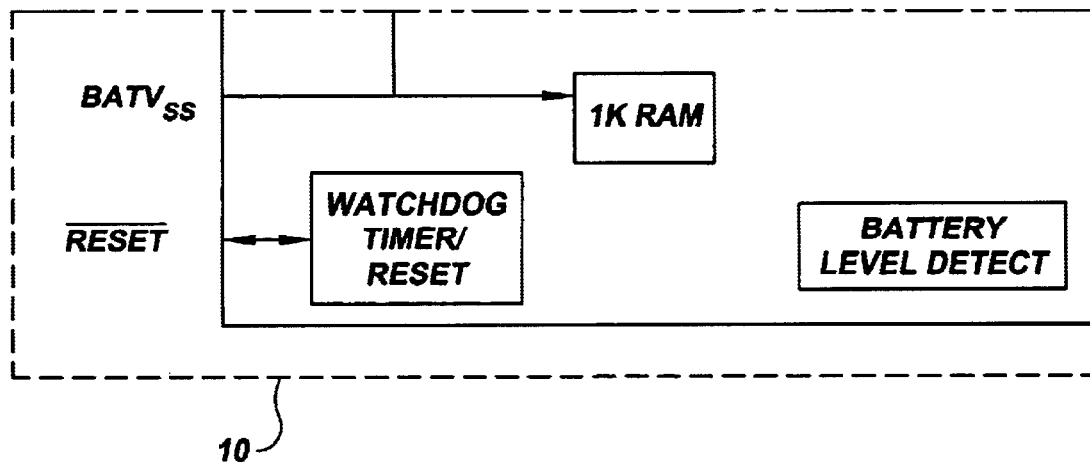
FIG. 1C is a block diagram of a portion of a controller for a digital cordless handset and base station, according to an example embodiment of the present invention.
Figure 1D:
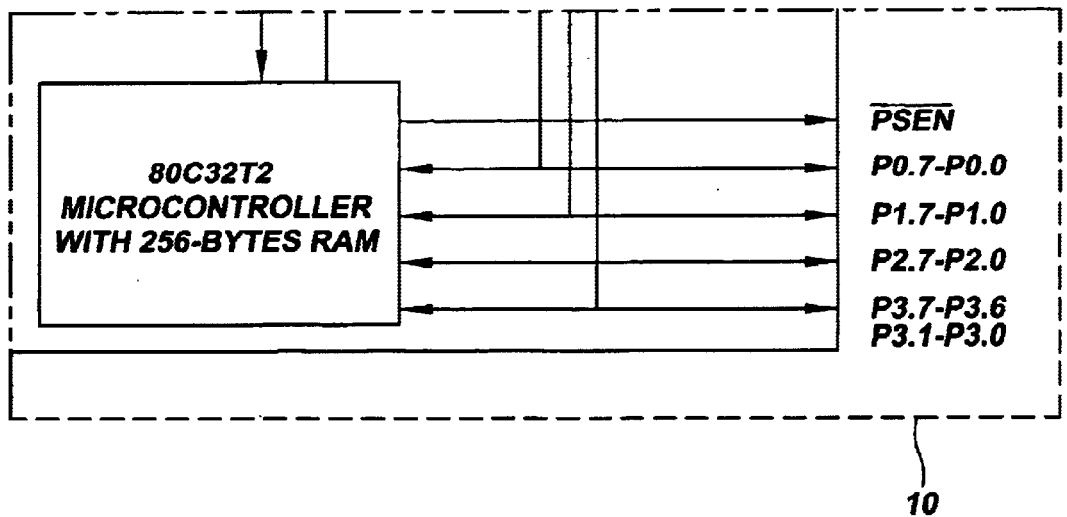
FIG. 1D is a block diagram of a portion of a controller for a digital cordless handset and base station, according to an example embodiment of the present invention.

Referring to FIGS. 1A, 1B, 1C and 1D a controller for data processing is indicated generally at 10. The controller may be, for example, the Am79C410A CT2 controller or some other controller. The controller generally includes a transcoder 102 and a codec 101 such as shown in FIG. 1B.

Figure 2:
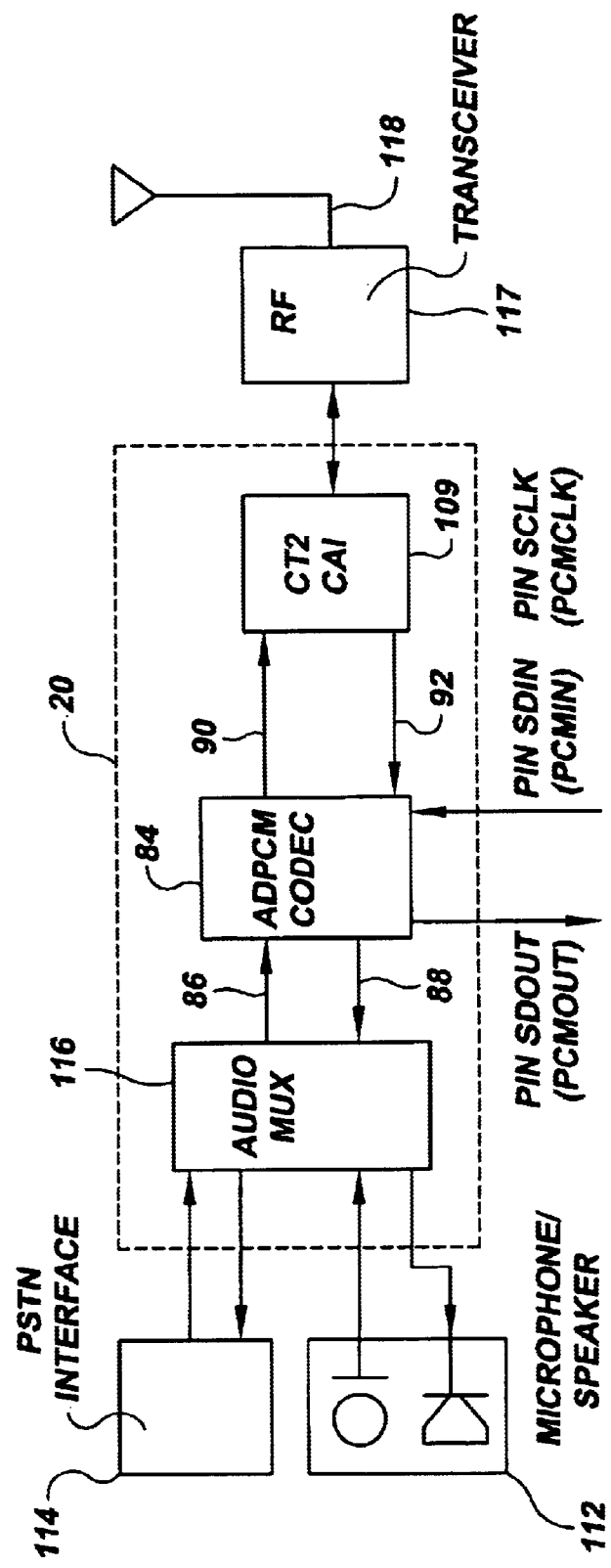
FIG. 2 (PRIOR ART) is a block diagram illustrating an Adaptive Differential Pulse Code Modulation (ADPCM) coder/decoder (codec) of an exemplary prior version of a controller.

Referring now to FIG. 2, an exemplary prior version of a controller 20 is illustrated, which controller includes an ADPCM codec device 84. Adaptive Differential Pulse Code Modulation (ADPCM) is a speech coding method which calculates the difference between two consecutive speech samples in standard PCM coded telecom voice signals. A coder/decoder (codec) converts a digital signal to an analog signal, and an analog signal to a digital signal. The ADPCM codec 84 at FIG. 2 generally includes an ADPCM input 92, an ADPCM output 90, a codec input 86 and a codec output 88. The codec output 88 and codec input 86 communicate with an audio multiplexer 116. A multiplexer is an electronic circuit which allows two or more signals to proceed over one communications circuit. The audio multiplexer 116 transmits signals to and from a Public Switched Telephone Network (PSTN) interface 114 and to and from a microphone/speaker 112.

Still referring to FIG. 2, a CT2 Common Air Interface (CAI) 109 receives the ADPCM output 90 and transmits a signal for ADPCM input 92. The CT2 CAI 109 performs CT2 formatting for a radio frequency (RF) transceiver 117 which includes an antenna 118. The controller 20 also provides PCM interface signals, (PCMCLK via pin SCLK, PCMIN via pin SDIN, and PCMOUT via pin SDOUT) for use by external circuitry. The ADPCM codec 84 performs all data processing internally and does not provide access for external intermediate data processing.

Figure 3:
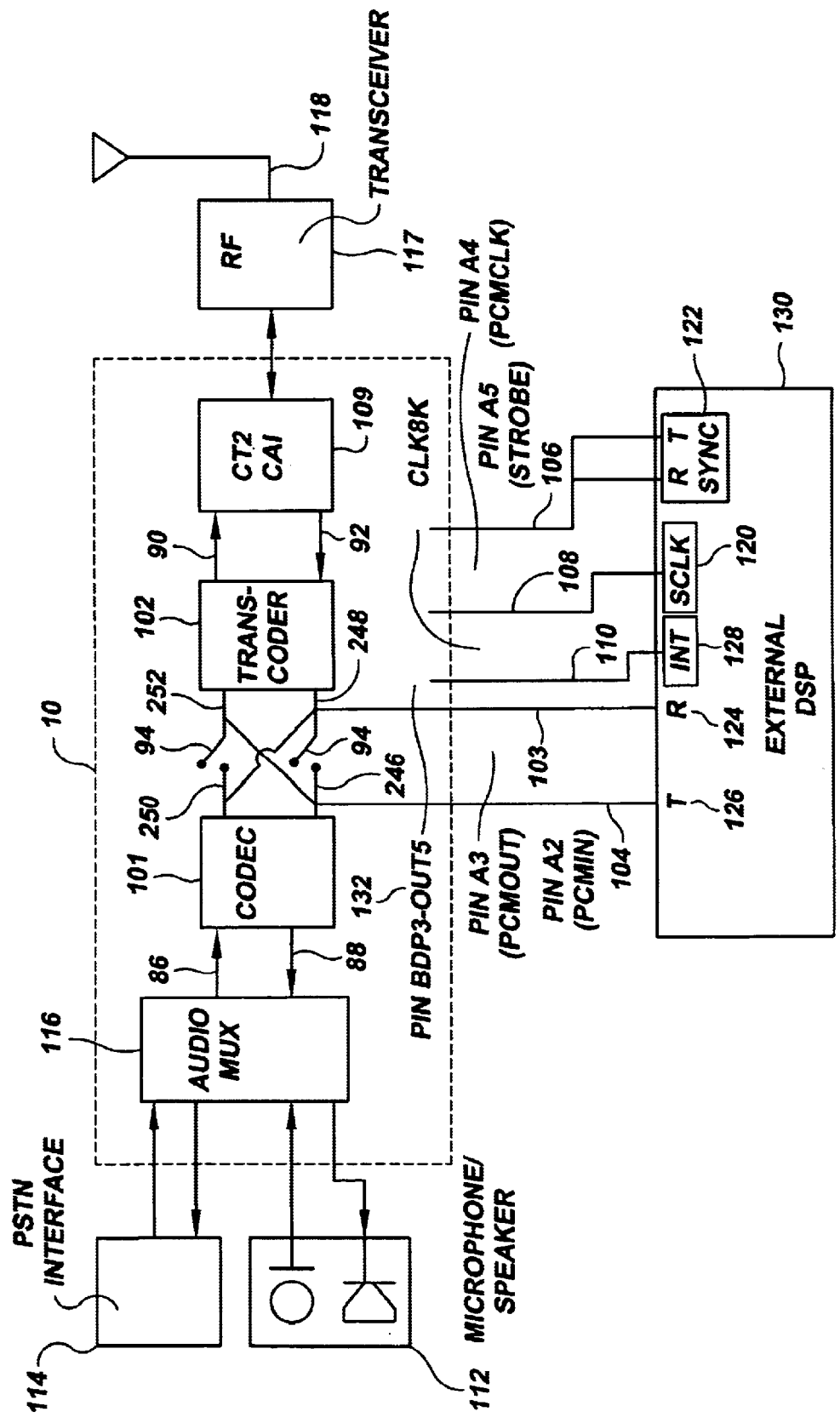
FIG. 3 is a block diagram illustrating a transcoder and a codec which reflect the ADPCM codec of FIG. 2 of the preferred embodiment of the present invention.
Figure 3:
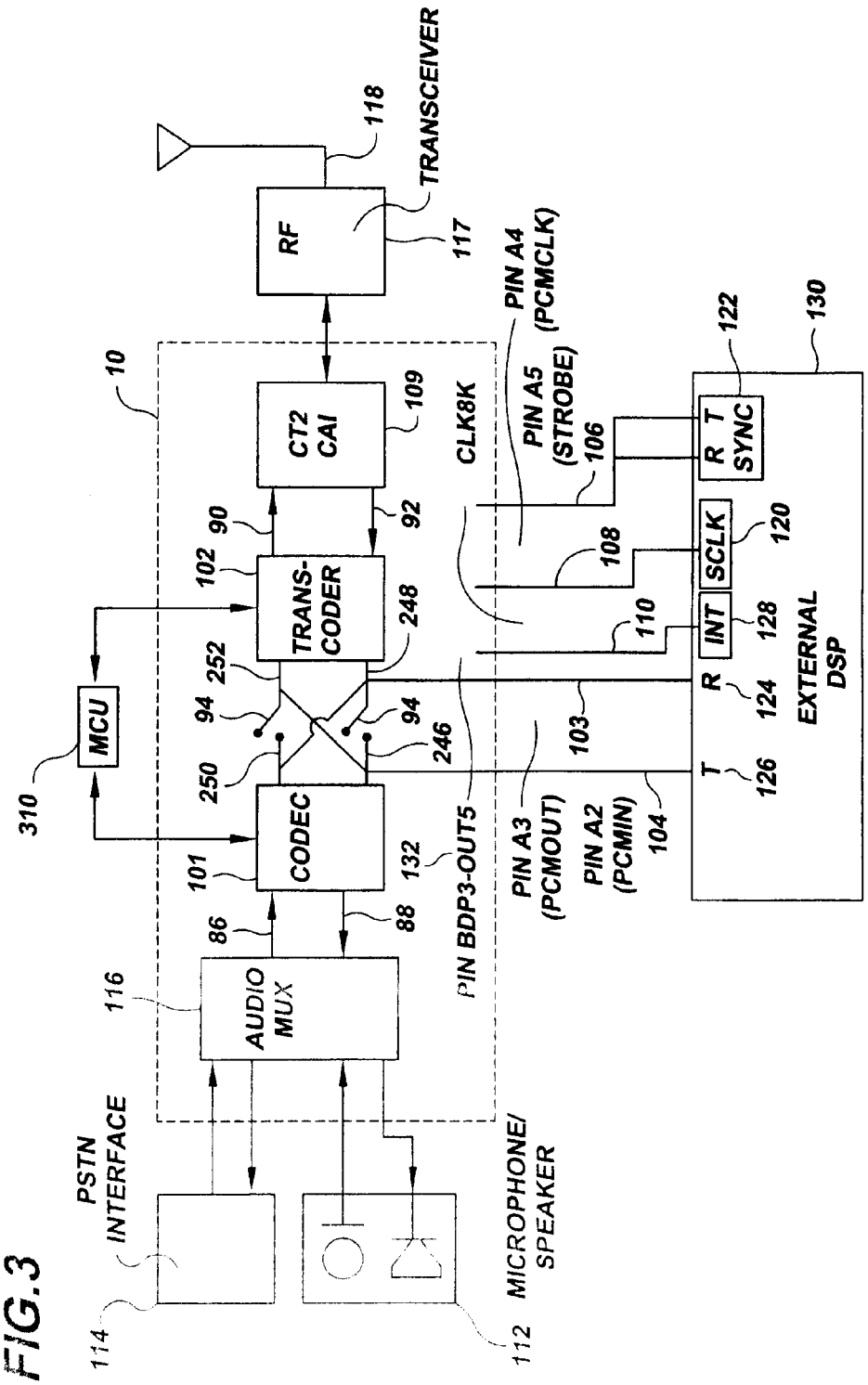

Referring now to FIG. 3, according to the preferred embodiment of the present invention, the ADPCM codec 84 of FIG. 2 is replaced by a transcoder 102 and a codec 101 as illustrated in FIG. 3. This embodiment of FIG. 3 further illustrates how digital signals transmitted between the transcoder 102 and the codec 101 are diverted for external intermediate data processing. The controller 10 also provides an 8 kHz clock signal (CLK8K) 110, the PCMCLK signal 108 and a STROBE 106, for use by external circuitry. The physical separation of the transcoder 102 and codec 101, within the controller, provides the capability for external intermediate data processing by external circuitry, such as, for example, an external DSP 130.

Further referring to FIG. 3, external intermediate data processing in the preferred embodiment is implemented by providing the capability to divert digital signals which are transmitted between the transcoder 102 and codec 101. The transmitted digital signals are diverted by utilizing a programmable switch 94. If the programmable switch 94 is closed, all processing of digital signals is performed internally within the controller 10. However, if the programmable switch 94 is open, digital signals between the transcoder 102 and the codec 101 are diverted to the external DSP 130 for external intermediate data processing. A diverted digital signal from either the transcoder 102 or the codec 101 is accessed by external circuitry through the utilization of multiplexed pin A3 (PCMOUT) at 103. Once the external circuitry has performed the appropriate data processing, the processed digital signal is reinserted into the controller 10 through the utilization of multiplexed pin A2 (PCMIN) at 104.

Still referring to FIG. 3, external intermediate data processing in the preferred embodiment allows the implementation of external circuitry for features such as security/encryption, intercom, or handset hands-free only operations. The external intermediate data processing enables the implementation of new data processing features without the requirement that a new controller be created for each new or different data processing concept.

Now referring to FIG. 4, a schematic representation of the codec 101 and the transcoder 102 of the preferred embodiment of the invention is illustrated in greater detail. In the embodiment, the transcoder 102 supports processing of PCM and digital streams. Pulse Code Modulation (PCM) is the most common method of encoding an analog voice signal into a digital bit stream. First, the amplitude of the voice conversation is sampled in a procedure Pulse Amplitude Modulation (PAM). The amplitude is then coded (quantized) into a binary (digital) number (i.e., zeros and ones). Adaptive Differential Pulse Code Modulation (ADPCM) is a speech coding method which calculates the difference between two consecutive speech samples in standard PCM coded telecom voice signals. The transcoder 102 supports the following formats for the PCM digital signal stream: A-law, $\mu$-law and linear.

Still referring to FIG. 4, the transcoder 102 of the preferred embodiment is comprised of the following: an ADPCM decoder 206, a noise suppressor 208, an Rx (receive) attenuator 210, a first summation device 212, a tone generator 214, a Tx (transmit) attenuator 228, a second summation device 230, an ADPCM encoder 232, an A/$\mu$-law PCM decoder 236, an A/$\mu$-law PCM encoder 234, an A/$\mu$-law/linear PCM decoder 238, an A/$\mu$-law/linear PCM encoder 242, a transcoder input port path 246, a transcoder output port path 250, an ADPCM to A/µ-law path 254, an A/µ-law to ADPCM path 256 and a loopback 2 path 258.

Continuing to refer to FIG. 4, in the preferred embodiment, the codec 101 performs the necessary operations for converting a digital signal to an analog signal, and an analog signal to a digital signal. The codec of the embodiment is comprised of the following: a low pass filter (LPF) 216, an interpolator 218, a D/A converter 220, a linear PCM decoder 244, an A/D converter 222, a decimator 224, a high pass filter (HPF), low pass filter (LPF), direct current (DC) rejector 226, a linear PCM encoder 240, a codec output port path 248 and a codec input path 252.

Still referring to FIG. 4, the transcoder 102 of the preferred embodiment receives digital signal data streams in the following formats: 32 kilobits per second (kbps) ADPCM, and 64 kbps A/µ-law PCM, and 128 kbps linear PCM. The 32 kbps digital signal stream is in ADPCM format and is received by the ADPCM decoder 206 which converts the ADPCM data stream into a linear digital signal format (digital signal). The 64 kbps data stream must be in either A-law or µ-law PCM format and is received by the A/µ-law PCM decoder 236, which converts the received data stream into a linear digital signal format (digital signal). The digital signal from the ADPCM decoder 206 is received by the noise suppressor 208 and Rx (receive) attenuator 210. The noise suppressor 208 analyzes the digital signal and outputs an appropriate signal to mute the digital signal if it is not human speech (i.e., noise). The digital signal from the A/µ-law PCM decoder 236 is also received by the Rx attenuator 210. The Rx attenuator 210 attenuates the received digital signal by creating a certain amount of loss to the digital signal's amplitude. The Rx attenuator 210 is programmable and is affected by the noise suppressor 208. A summing device 212 performs summing of a tone generated by the tone generator 214 and the received digital signal from the Rx attenuator 210. The output from the summing device 212 is a voice plus tone digital signal and is received by either the low pass filter 216, or the A/µ-law/linear PCM encoder 242 (via transcoder output port path 250). The low pass filter 216 manipulates the shape of the digital signal spectrum before digital-to-analog conversion of the digital signal. The output from the low pass filter 216 is received by the interpolator 218. The interpolator 218 increases the sampling rate to a higher frequency so that improved resolution is achieved during the digital-to-analog conversion of the digital signal. The output from the interpolator 218 is received by D/A converter 220 which converts the digital signal to an analog wave form representation.

Still referring to FIG. 4, in the preferred embodiment, an analog waveform is received by the A/D converter 222 and converted to a linear digital signal representation (digital signal). The digital signal is received by decimator 224 which decreases the sampling rate of the digital signal to about 32 kilohertz (kHz). The output from the decimator 224 is received by the HPF, LPF and DC rejector 226. The high pass filter within block 226 cuts the frequency off at about 3.9 kilohertz (kHz), and the low pass filter within block 226 cuts the frequency off at about 60 hertz (for A/C type interference). The DC rejector within block 226 removes any DC offset. The output from the HPF, LPF and DC rejector 226 is received by Tx (transmit) attenuator 228 or the linear PCM encoder 240 (via codec output port path 248). The Tx attenuator 228 provides gain control for the digital signal and is programmable. The output from the Tx attenuator 228 is received by a summing device 230. The summing device 230 sums the digital signal from the tone generator 214 with the received digital signal from the Tx attenuator 228. The output signal from the summing device 230 is received by the ADPCM encoder 232, the A/µ-law PCM encoder 234 or the Rx attenuator 210 (via loopback 2 at 258). The ADPCM encoder 232 converts the digital signal into ADPCM format operating at 32 kbps. The A/µ-law PCM encoder 234 converts the digital signal into either A-law or µ-law PCM format operating at 64 kbps with a frequency of 512 kHz. The ADPCM to A/µ-law path 254 provides the capability to convert a digital signal from the ADPCM decoder 206 into either an A-law or claw PCM format operating at 64 kbps. The A/µ-law PCM to ADPCM path 256 provides the capability to convert a digital signal from the A/µ-law PCM decoder 236 into an ADPCM signal operating at 32 kbps.

Further referring to FIG. 4, intermediate data processing of the digital signal by external circuitry is implemented in the preferred embodiment by connection to port paths 250 and 246 of the transcoder 102 and port paths 252 and 248 of the codec 101.

Continuing to refer to FIG. 4, the codec output port path 248 of the preferred embodiment allows the diversion of the digital signal before the transcoder 102 for external data processing. The codec output port path 248 is provided with a linear PCM encoder 240 which receives the diverted digital signal and converts it to a linear PCM format. Once the external processing of the digital signal has been accomplished the processed digital signal is inserted via transcoder input port path 246. However, the processed digital signal must be in linear PCM format. The transcoder input port path 246 accesses the transcoder 102 before the Tx attenuator 228 and is provided with an A/µ-law/linear PCM decoder 238, which converts the processed digital signal into a linear digital signal for the Tx attenuator 228.

Still referring to FIG. 4, the transcoder output port path 250 of the preferred embodiment allows the diversion of the digital signal before the codec 101 for external data processing. The transcoder output port path 250 is provided with an A/µ-law/linear PCM encoder 242 which converts the digital signal to either A-law, µlaw or linear PCM format. Once the external processing of the diverted digital signal has been accomplished the processed digital signal is inserted via codec input port path 252. However, the processed digital signal must be in linear PCM format. The codec input port path 252 accesses the codec 101 before the LPF 216, and is provided with a linear PCM decoder 244 which converts the processed digital signal into a linear digital signal for the LPF 216.

To support voice-switched hands-free operation, the codec 101 and transcoder 102 of the exemplary embodiment further include peak registers RX_HF register 452 and TX_HF register 454. The registers 452 and 454 store values representing the peak amplitude of the voice signal in the receive and transmit directions, respectively, for supporting a software implementation in the controller to provide hands-free operation. Software in the controller monitors voice levels in the receive and transmit paths, performs comparisons of the receive and transmit levels, and modifies the receive and transmit attenuation levels via registers in path attenuators 210, 228 to implement voice-switched hands-free operation.

The RX_HF register 452 and TX_HF register 454 are each updated once every 125 Tsec and can be read by the controller software at any time. In updating the registers 452, 454, the present values in the registers are compared to the present peak signal values on lines 254 and 248 respectively. If the present peak signal value is greater than the present value in the register 452 or 454, the new value is stored in the register. Otherwise, the register 452 or 454 is not updated. The default value in both registers is 0000 0000. When the user, via a microcontroller (MCU) 310, as shown in FIG. 3, reads from a register 452 or 454, the register is reset to 0000 0000.

The registers 452, 454 are updated in a double buffered fashion. Note that the registers 452 and 454 include suitable buffer circuitry. If an update occurs while the microcontroller is reading from a register, the value read will not change. However, the update value will be stored in the register following the read operation and the register will not be reset.

The format of the data in the peak registers 452, 454 is unsigned magnitude A-law without the conventional even-bit inversion. Refer to ITU recommendation G.711 for more information. The format is 0SSS CCCC. The compression format is logarithmic in nature: the SSS value is the 3-bit segment representing the exponent, where 000 is the smallest exponent and 111 is the largest exponent. Bits CCCC are the mantissa bits describing quantization levels within each segment.

Now referring to FIG. 5, the preferred embodiment of interface timing for external processing of the diverted digital signals from the transcoder 102 and the codec 101 is illustrated. In the embodiment, the internal 8 kHz frame synchronization clock signal 110 (CLK8K) is phase-locked to an input 500 Hz. CT2 frame sync, so that the rising edge of the internal CLK8K signal corresponds to the 500 Hz transitions. As was shown in FIG. 3, pin BDP3_OUT5 132 transmits the CLK8K signal 110 to external circuitry such as the DSP 130. Two bits in a register internal to the controller 10 can be used for this frame synchronization.

Still referring to FIG. 5, the interface timing between the external circuitry, for example, an external DSP 130 (FIG. 3), and the controller may be coordinated in the preferred embodiment by STROBE output 106. In that event, STROBE output 106 may produce four pulses (TS0–TS3) during a single frame of the CLK8K signal 110 and is provided on pin A5. The first and third strobe pulses, TS0 and TS2, may be utilized by external circuitry for the receipt and transfer of a digital signal from the port paths of either the transcoder 102 or the codec 101. In this arrangement, if the STROBE output 106 is active during the first time slot, pulse (TS0), the external circuitry may interface with the codec port paths 248 and 252 (FIG. 4), and/or if the STROBE output 106 is active during the third time slot, pulse (TS2), the external circuitry may interface with the transcoder port paths 246 and 250 (FIG. 4). The defining of the two strobe pulses in this instance may be required, since port paths for the transcoder and the codec are multiplexed (via pin A3 (PCMOUT) 103 and pin A2 (PCMIN) 104). Further in the arrangement, the other two pulses, TS1 and TS3, may be utilized by external circuitry acting as a slave to the controller.

Still referring to FIG. 5, in the preferred embodiment, a register strobe enable (STROBEN) may be provided in the controller described to enable and disable the four pulses that may be, as described, associated with the STROBE output 106. The register STROBEN in such instance may be defined as indicated below.

| Register: | STROBEN |
|---|---|
| Address: | FF2A |
| Bit | Definition |
| 3 | Time slot 3 enable (last quadrant of 8 kHz frame). 0: = disable, 1: = enable. |
| 2 | Time slot 2 enable (third quadrant of 8 kHz frame). 0: = disable, 1: = enable. |
| 1 | Time slot 1 enable (second quadrant of 8 kHz frame). 0: = disable, 1: = enable. |

-continued

| | |
|---|---|
| 0 | Time slot 0 enable (first quadrant of 8 kHz frame). 0: = disable, 1: = enable. |

Still referring to FIG. 5, in the preferred embodiment, a DSPCTR register of the controller may have bits which are defined as indicated below.

| Register: | DSPCTR | |
|---|---|---|
| Address: | FF5C | |
| Bit | Definition | |
| A0 pin undriven at reset (A7–A0 pins used as address latch (default)): | | |
| 4:3 | Reserved | |
| 2:0 | Codec Path Configuration | |
| | 000: | Normal ADPCM Codec configuration (ADPCM-Analog) |
| | 001: | PCM Codec Configuration (A-law PCM at SDIN and SDOUT pins-Analog) |
| | 010: | Loopback 2 (Analog-Analog) |
| | 100: | ADPCM Transcoder Configuration (A-law PCM at SDIN and SDOUT pins-ADPCM) |
| A0 pin driven to 0 at reset (A7–A0 pins redefined to be serial voice I/O) | | |
| 4 | Bypass Attenuators | |
| | 1: | Allow TXATTN and RXATTN attenuators to attenuate signals and allow injection of dual tone signals, if appropriately programmed. |
| | 0: | Signals bypass the TXATTN and RXATTN attenuators and the dual tone generator is disabled. This configuration allows the controller to perform ADPCM-PCM transcoding functions with bit-for-bit compliance to CCITT G. 721 using the test sequences recommended by CCITT. |
| 3:0 | Codec Path Configuration | |
| | 0000: | Normal (ADPCM-Analog) |
| | 0001: | Linear Master PCM Port for Hands-Free/Echo Cancellation (ADPCM-Linear PCM on A5-A2, Linear PCM on A5-A2-Analog) |
| | 0010: | Loopback 2 (Analog-Analog) |
| | 1001: | Linear Slave PCM Port (ADPCM-Linear PCM on pins A5–A2) |
| | 0100: | A-law ADPCM Transcoder Configuration (ADPCM-A-Law PCM on pins A6–A2) |
| | 1100: | μ-law ADPCM Transcoder Configuration (ADPCM-μ-law PCM on pins A6–A2) |

Still referring to FIG. 5, access to the transcoder and codec paths in the preferred embodiment is provided by utilizing and redefining the latched address port's multiplexed pins 0–7. In the embodiment, the status pin A0 of the latched address port's multiplexed pins controls whether pins A1 through A7 are redefined for external data processing. The status of pin A0 is determined at the end of reset. If A0 is not externally driven low, the latched address port will operate normally as an 8-bit address output port. If A0 is externally driven low, the address port drivers are disabled and the port is redefined as illustrated below.

| Pin Name | A0 = Undriven (default) | A0 = 0 at Reset and DSPCTR [3:0] ↳ x001 or ↳ x100 | A0 = 0 at Reset and DSPCTR [3:0 = 0001 (Linear Master PCM Voice I/O) | A0 = 0 at Reset and DSPCTR [3:0 = 1001 (Linear Slave PCM Voice I/O) | A0 = 0 at Reset and DSPCTR [3:0 = x100 (A-Law/μ-Law PCM Voice I/O) |
|---|---|---|---|---|---|
| ALE_CLK4M | CLK4M output or ALE output or ALE input | ALE output or ALE input | ALE output or ALE input | ALE output or ALE input | ALE output or ALE input |
| A7 | Address 7 output | CLK4M output | CLK4M output | CLK4M output | CLK4M output |
| A6 | Address 6 output | Reserved. Do not connect. | Reserved. Do not connect. | Reserved. Do not connect. | Receive PCM strobe input (RE) |
| A5 | Address 5 output | High (weak internal pull-up) | STROBE outut | STROBE input | Transmit PCM strobe input (TE) |
| A4 | Address 4 output | High (weak internal pull-up) | PCMCLK output | PCMCLK input | PCMCLK input |
| A3 | Address 3 output | High (weak internal pull-up) | TDM TX/RX PCM output | TDM TX/RX PCM output | Receive PCM output |
| A2 | Address 2 output | High (weak internal pull-up) | TDM TX/RX PCM input | TDM TX/RX PCM input | Transmit PCM input |
| A1 | Address 1 output | Reserved. Do not connect. | Reserved. Do not connect. | Reserved. Do not connect. | Reserved. Do not connect. |
| A0 | Address 0 output | Mode select 0 (tie to $V_{SS}$) | Mode select 0 (tie to $V_{SS}$) | Mode select 0 (tie to $V_{SS}$) | Mode select 0 (tie to Vss) |
| SCLK | Serial Port clock out or PCM clock out | Serial Port clock only | Serial Port clock only | Serial Port clock only | Serial Port clock only |
| SDIN | Serial Port data in or PCM data in | Serial Port data in only | Serial Port data in only | Serial Port data in only | Serial Port data in only |
| SDOUT | Serial Port data out or PCM data out | Serial Port data out only | Serial Port data out only | Serial Port data out only | Serial Port data out only |

Referring again to FIG. 3, an example is shown of utilizing, in the preferred embodiment, the port paths provided by the transcoder 102 and the codec 101 by an external DSP 130. In the embodiment, the external DSP 130 processes the diverted signals (data) to provide an intercom or echo cancellation. The external DSP 130 is physically connected to the controller 10 in the following manner: the CLK8K signal 110 (via pin BDP3_OUT5) is connected to interrupt control (INT) 128. The PCMCLK signal 108 is connected to slave clock (SCLK) 120, Synchronization of receive (R) pin 124 and transmit (T) pin 126 is coordinated by connecting the strobe output 106 to RT Sync 122. Pin R 124 is connected to pin A3 103 in order to receive and process diverted data (signals). Pin T 126 is connected to pin A2 104 so that processed data from the external DSP 130 can be transmitted to either the transcoder 102 or the codec 101.

According to another example embodiment of the present invention, an external DSP, shown in FIG. 3, is further coupled via PIN A2 104 and PIN A3 103 to registers 452 and 454, shown in FIG. 4, in transcoder 102 and CODEC 101, respectively. The DSP is adapted to update the value in each register with present peak output and input levels, respectively, when the present levels are higher than a stored peak level in the registers.

Numerous modifications and variations of the embodiments and, in particular, the preferred embodiments of the invention are possible in light of the teachings herein. Each of these modifications and variations are intended to be included in the description herein and form a part of the present invention. The foregoing detailed description is, thus, to be clearly understood as being given by way of illustration and example only, the spirit and scope of the present invention being limited solely by the appended claims.

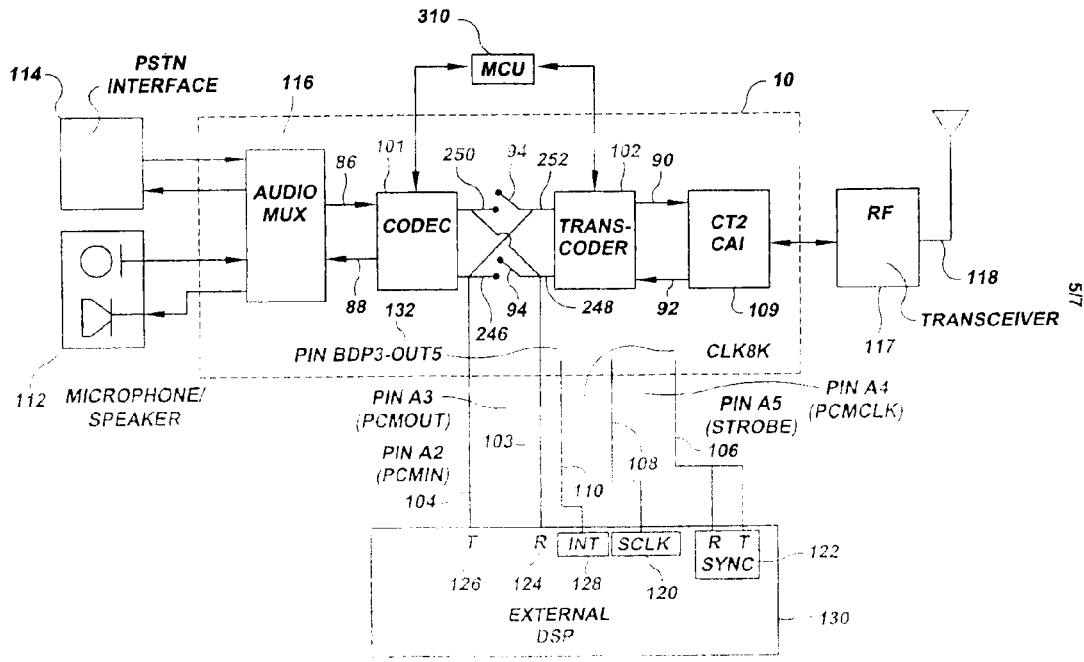

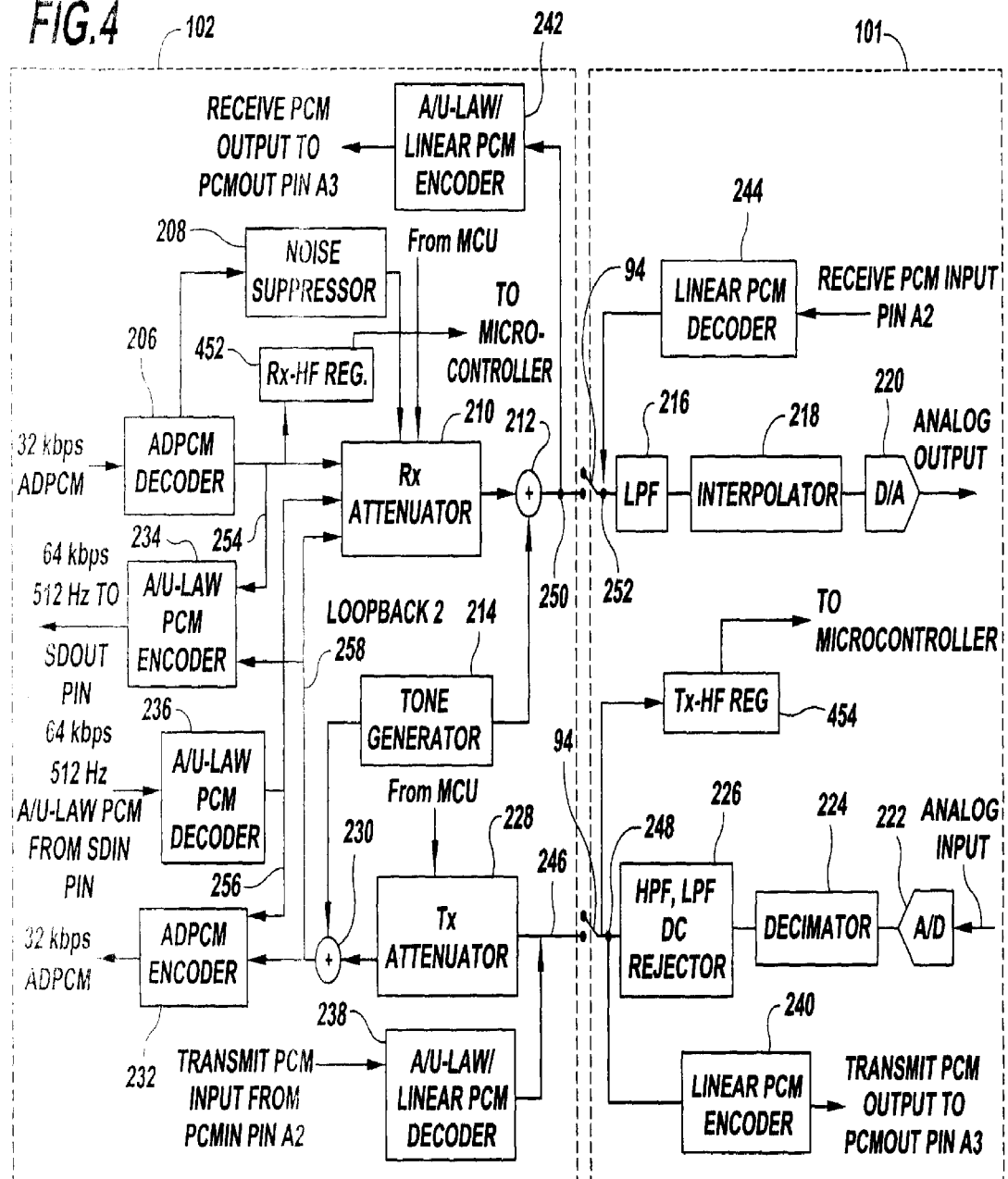

What is claimed is:

1. A transcoder-codec circuit arrangement that supports voice-switched hands-free radio operation, comprising:

a first register arranged to store a value indicative of a peak signal in a receive signal path;

a first attenuator coupled to the receive signal path;

a second register arranged to store a value indicative of a peak signal in a transmit signal path;

a second attenuator coupled to the transmit signal path;

a digital signal processor coupled to the first and second registers and configured and arranged to update the value in the first register with a present peak receive signal level if the value in the first register is less than the present peak receive signal level, and arranged to update the value in the second register to a present peak transmit signal level if the value in the second register is less than the present peak transmit signal level; and a microcontroller coupled to the first and second registers and to the first and second attenuators and configured to read values from the first and second register and adjust the first and second attenuators in response to the values.

2. The arrangement of claim 1, further comprising:

a first programmable switch coupled to the receive signal path;

a second programmable switch coupled to the transmit signal path; and the digital signal processor coupled to the first and second programmable switches and arranged to process transmit and receive signals.

3. The arrangement of claim 1, further comprising:
a transcoder including the first register, the first attenuator, and the second attenuator; and
a codec including the second register.

4. The arrangement of claim 3, further comprising:
a first programmable switch coupled to the receive signal path;
a second programmable switch coupled to the transmit signal path; and
the digital signal processor coupled to the first and second programmable switches and arranged to process transmit and receive signals.

5. The arrangement of claim 1, wherein the digital signal processor is arranged to update the value in the first register with a present peak amplitude of the receive signal level and to update the value in the second register with a present peak amplitude of the transmit signal level.

6. The arrangement of claim 5, wherein the digital signal processor is configured to periodically compare values in the first and second registers to the present peak receive signal level and present peak transmit signal level.

7. The arrangement of claim 6, wherein the digital signal processor is configured to periodically compare the values approximately every 125 microseconds.

8. The arrangement of claim 6, wherein the microcontroller is configured to reset to a predetermined value the values in the first and second registers after the values are read.

9. The arrangement of claim 8, wherein the predetermined value is 0.

10. A method for supporting voice-switched hands-free radio operation in a transcoder-codec circuit arrangement, comprising the steps of:
storing in a first register a value indicative of a peak signal in a receive signal path;
storing in a second register a value indicative of a peak signal in a transmit signal path;
periodically updating the value in the first register with a present peak receive signal level if the value in the first register is less than the present peak receive signal level;
periodically updating the value in the second register with a present peak transmit signal level if the value in the second register is less than the present peak transmit signal level;
reading values from the first and second registers with a microcontroller; and
adjusting attenuation levels of signals in the receive signal path and in the transmit signal path in response to values read from the first and second registers.

11. The method of claim 10, further comprising the steps of:
selectively diverting transmit signals from the codec to a digital signal processor when a control signal is in a first state;
routing processed transmit signals from the digital signal processor to the transcoder when the control signal is in the first state;
selectively diverting receive signals from the transcoder to the digital signal processor when a control signal is in the first state; and
routing processed receive signals from the digital signal processor to the codec when the control signal is in the first state.

12. The method of claim 10, further comprising the steps of:
updating the value in the first register with a present peak amplitude of the receive signal level; and
updating the value in the second register with a present peak amplitude of the transmit signal level.

13. The method of claim 10, further comprising the step of periodically comparing values in the first and second registers to the present peak receive signal level and present peak transmit signal level.

14. The method of claim 13, further comprising the step of periodically comparing the values approximately every 125 microseconds.

15. The method of claim 13, further comprising the step of resetting to a predetermined value the values in the first and second registers after the values are read.

16. The method of claim 15, wherein the predetermined value is 0.

17. An apparatus for supporting voice-switched hands-free radio operation in a transcoder-codec circuit arrangement, comprising:
means for storing a first value indicative of a peak signal in a receive signal path;
means for storing a second value indicative of a peak signal in a transmit signal path;
means for periodically updating the first value with a present peak receive signal level if the first value is less than the present peak receive signal level;
means for periodically updating the second value with a present peak transmit signal level if the second value is less than the present peak transmit signal level;
means for reading the first and second values; and
means for adjusting attenuation levels of signals in the receive signal path and in the transmit signal path in response to the read first and second values.

18. The apparatus of claim 17, further comprising:
means for selectively diverting transmit signals from the codec to a digital signal processor when a control signal is in a first state;
means for routing processed transmit signals from the digital signal processor to the transcoder when the control signal is in the first state;
means for selectively diverting receive signals from the transcoder to the digital signal processor when a control signal is in the first state; and
means for routing processed receive signals from the digital signal processor to the codec when the control signal is in the first state.

19. The apparatus of claim 17, further comprising:
means for updating the first value with a present peak amplitude of the receive signal level; and
means for updating the second value with a present peak amplitude of the transmit signal level.

20. The apparatus of claim 17, further comprising means for periodically comparing the first and second values to the present peak receive signal level and present peak transmit signal level.

21. The apparatus of claim 20, further comprising means for periodically comparing the values approximately every 125 microseconds.

22. The apparatus of claim 20, further comprising means for resetting to a predetermined value the first and second values after the values are read.

23. The apparatus of claim 22, wherein the predetermined value is 0.

* * * * *

UNITED STATES PATENT AND TRADEMARK OFFICE
CERTIFICATE OF CORRECTION

PATENT NO. : 6,768,776 B1
DATED : July 27, 2004
INVENTOR(S) : Mullins et al.

It is certified that error appears in the above-identified patent and that said Letters Patent is hereby corrected as shown below:

The title page showing the print figure should be deleted, and replaced with the attached amended title page.

Drawing sheets, consisting of Fig. 3-4, should be deleted and replaced with the drawing sheets, consisting of Fig. 3-4, as shown on the attached pages.

<u>Column 1,</u>
Line 10, "apilication" should read -- application --.

<u>Column 9,</u>
Line 7, "(dafault)" should read -- (default) --.
Line 15, "STROBE outut" should read -- STROBE output --.

Signed and Sealed this

Sixth Day of June, 2006

JON W. DUDAS
*Director of the United States Patent and Trademark Office*

(12) United States Patent  (10) Patent No.: US 6,768,776 B1
Mullins et al.  (45) Date of Patent: Jul. 27, 2004

(54) TRANSCODER-CODEC CIRCUIT ARRANGEMENT AND METHOD THAT SUPPORTS VOICE-SWITCHED HANDS-FREE RADIO OPERATION

(75) Inventors: Jacqueline E. Mullins, Austin, TX (US); Daren Ledell Allee, Austin, TX (US); John G. Bartkowiak, Austin, TX (US)

(73) Assignee: Legerity, Inc., Austin, TX (US)

( * ) Notice: Subject to any disclaimer, the term of this patent is extended or adjusted under 35 U.S.C. 154(b) by 1101 days.

(21) Appl. No.: 09/047,866

(22) Filed: Mar. 25, 1998

Related U.S. Application Data

(63) Continuation-in-part of application No. 08/909,383, filed on Aug. 11, 1997, now Pat. No. 5,946,353, which is a continuation of application No. 08/668,600, filed on Jun. 18, 1996, now Pat. No. 5,657,351, which is a continuation of application No. 08/192,057, filed on Feb. 4, 1994, now abandoned.

(51) Int. Cl.[7] .............................................. H04B 14/06
(52) U.S. Cl. ......................................................... 375/244
(58) Field of Search ........................... 375/244; 327/58; 379/390

(56) References Cited

U.S. PATENT DOCUMENTS 4,686,390 A  *  8/1987  Cleary, Jr. et al. ............. 327/58

5,471,528 A  * 11/1995  Reesor ........................ 379/390

FOREIGN PATENT DOCUMENTS

WO  WO9306679  * 4/1993  ................. 379/390

* cited by examiner

Primary Examiner—Khai Tran
Assistant Examiner—Kevin M Burd

(57) ABSTRACT

A transcoder-codec circuit arrangement that supports voice-switched hands-free radio operation. A first register is arranged to store a value indicative of a peak signal in a receive signal path, a first attenuator is coupled to the receive path, a second register is arranged to store a value indicative of a peak signal in a transmit signal path, a second attenuator is coupled to the transmit signal path, and a digital signal processor is coupled to the first and second registers and configured and arranged to update the value in the first register with a present peak receive signal level if the value in the first register is less than the present peak receive signal level. The digital signal processor is further arranged to update the value in the second register to a present peak transmit signal level if the value in the second register is less than the present peak transmit signal level. A microcontroller is coupled to the first and second registers and to the first and second attenuators and is configured to read values from the first and second register and adjust the first and second attenuators in response to the values.

23 Claims, 7 Drawing Sheets